(No Model.)
W. A. JOHNSTON.
STOP VALVE FOR GAGES.
No. 506,115. Patented Oct. 3, 1893.
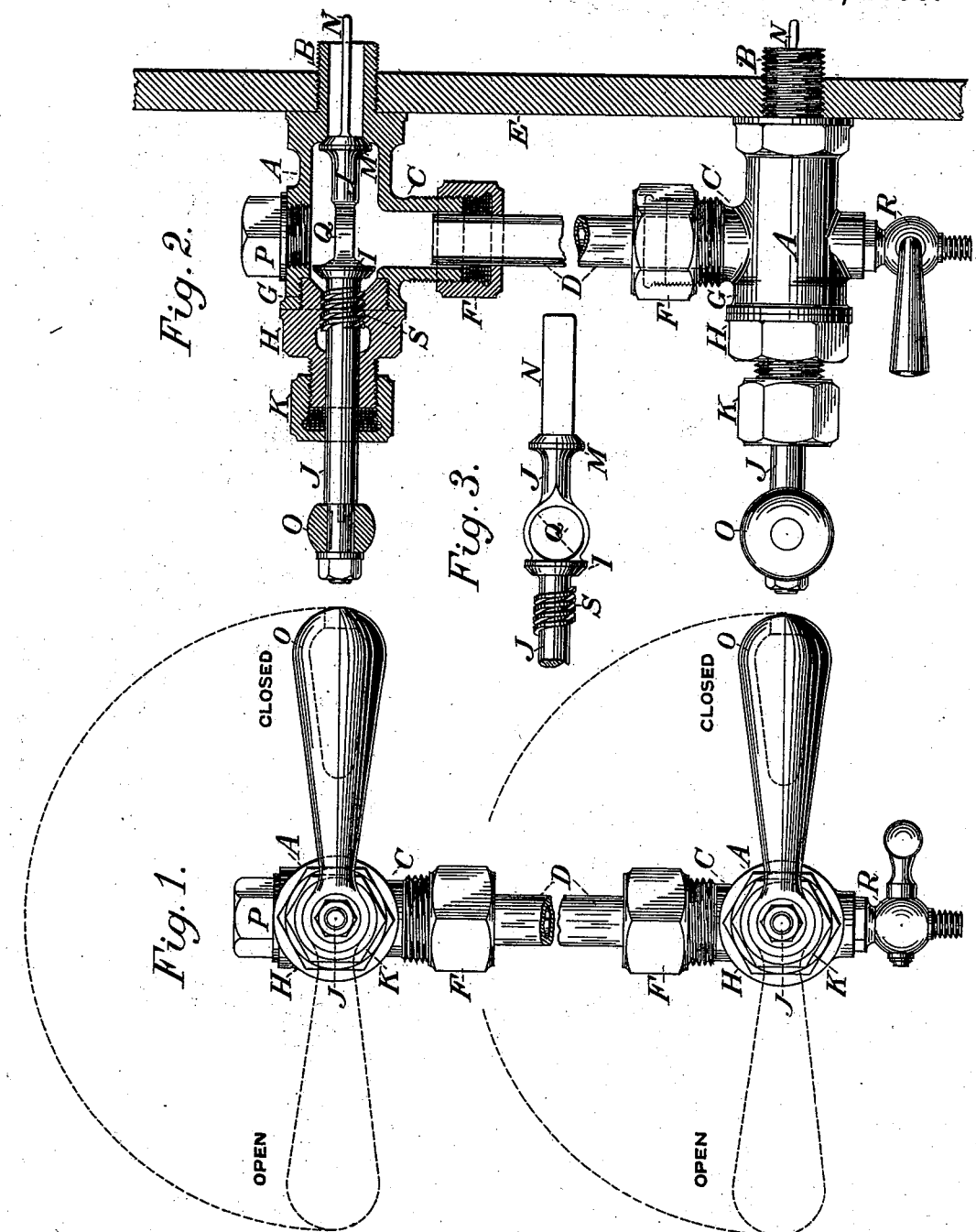
Witnesses:
E. A. Brandau
Wilson D. Bent Jr.
Inventor:
William A. Johnston
By John Richards
Atty

UNITED STATES PATENT OFFICE.

WILLIAM A. JOHNSTON, OF SAN FRANCISCO, CALIFORNIA.

STOP-VALVE FOR GAGES.

SPECIFICATION forming part of Letters Patent No. 506,115, dated October 3, 1893.

Application filed October 15, 1892. Serial No. 449,001. (No model.)

*To all whom it may concern:*

Be it known that I WILLIAM A. JOHNSTON, a citizen of the United States, residing at San Francisco, county of San Francisco, and State of California, temporarily residing abroad, at Honolulu, Hawaii, have invented a new and useful Improvement in Stop-Valves; and I hereby declare the following specification and the drawings forming a part thereof to be a full, clear, and exact description of my improvement.

My invention relates to stop valves, especially those exposed to high pressure, and consists in forming the valves dual, one to permit or arrest the flow of liquids or gases, and the other to close the stem-way through which the valve is operated, so that when the main or stop valve is opened, the opposite or guard valve can be closed; also in providing a quick moving screw or nut, behind or outside of the back-check valve, so as to open or close the valves suddenly when necessary, and so that their position will be indicated by the external stem or connections thereof.

The object of my invention is to provide a ready and inexpensive means of closing or preventing leaks around the valve stem, or through the packing gland, in case of accident or any failure of the gland mechanism; also for the renewal of packing or other repairs to the valve stem or gland without exposure to the pressure of the liquid or gas being dealt with; also to enable the open and closed positions of the valves to be seen externally from the stem or its fittings.

To illustrate an application of my invention I have chosen what is technically called a set of gage-glass fittings, such as are applied to steam boilers to indicate the height of the water therein. This application is one of especial importance, because of the frequent fracture of the glass tubes, and the necessity for sudden closing of the stop valve; also because the connection is direct to the boiler, and there is no intermediate means of shutting off the steam or water in case of accident.

Referring to the drawings: Figure 1 is a front elevation of a set of gage-glass fittings provided with my improved stop valves. Fig. 2 is a side view of the same, showing one of the valves in section. Fig. 3 is a detail showing the valve stem in a plane opposite to that in the section, Fig. 2.

Similar letters of reference on the different figures indicate corresponding parts thereof.

The main body of the valve A I form with an inlet nipple B, and an outlet nipple C, in the present case fitted for use in connection with a glass water tube D arranged in the usual manner, the nipple B being screwed into the boiler head E, and the nipple C being provided with a packing gland F to receive a glass tube D, as shown in the section Fig. 2. In the line of the nipple B there is a screw socket G to receive the member H, on the inner end of which is formed a seat for the back-check valve I, and behind this a screw nut S for the valve stem J. This member H is also provided with a packing gland K, through which passes the stem J, to prevent leak when both valves are open, and so that when the member H is removed from the socket G, the valves and stem can be drawn out for inspection or repairs without disturbing the main body A, or connections to the nipples B and C. The operating screw S, back-check valve I, stop valve M, and guiding extension N, are all formed integrally with the stem J, on the outer end of which is provided, in this case, a heavy handle O for operating the stem and the two valves I and M.

The two nipples B and C, named here inlet and outlet nipples, can be reversed as to functions, either one being the inlet or outlet according to the purpose to which the valve is applied.

On the upper valve or fitting I provide a plug P, and also through the stem J, form a hole or eye Q, through which a gage glass D can be passed from the top, while the stop valve M is closed, or in case of obstruction, an implement can be passed through this aperture to clear the glass tube D, or a pipe in the same position. At the bottom is placed a blow-off cock R to drain the gage glass and chambers connected therewith, also to enable blowing through from the upper valve to cleanse the glass, or clear it from sediment.

The screw thread at S, on the stem J, I make of a coarse pitch so that half a revolution of the handle O will open or close the valves I and H respectively, and by its position, right or left, show at a glance which valve is open and which is closed, also by reason of its weight hold either valve shut, accordingly as the side handle O is turned to the right or left.

Having thus described the nature and objects of my invention, what I claim as new, and desire to secure by Letters Patent, is—

In a stop valve, as herein described, a revoluble valve stem provided with a stop and back-check valve; a screw-threaded portion, and an aperture or eye through the stem between the valves, by means of which a glass tube can be inserted, when the valve is applied to a water gage, or through which an implement can be inserted to clear the passage at right angles to the valve stem, in the manner and for the purposes substantially as described and set forth.

In testimony whereof I have hereunto affixed my signature in the presence of two witnesses.

WILLIAM A. JOHNSTON.

Witnesses:
 ALEXANDER YOUNG,
 C. HEDEMANN.